United States Patent

[11] 3,628,912

| [72] | Inventors | Donald H. Oertle;<br>Frederick J. Radd, both of Ponca City, Okla. |
|---|---|---|
| [21] | Appl. No. | 778,755 |
| [22] | Filed | Nov. 25, 1968 |
| [45] | Patented | Dec. 21, 1971 |
| [73] | Assignee | Continental Oil Company<br>Ponca City, Okla. |

[54] PROCESS FOR INHIBITING HYDROGEN PERMEATION OF STEEL IN AMMONIA SERVICE
2 Claims, No Drawings

[52] U.S. Cl............................................. 21/2.5,
21/2.7, 23/193, 23/204, 206/84
[51] Int. Cl........................................... C23f 7/04,
C23f 9/02

[50] Field of Search............................................. 21/2.5, 2.7;
206/84; 23/193, 196, 204

[56] References Cited
UNITED STATES PATENTS

| 2,135,160 | 11/1938 | Beekhuis.................... | 23/193 X |
| 2,366,796 | 1/1945 | Lawrence et al............ | 206/84 X |
| 3,488,293 | 1/1970 | Hong et al................... | 21/2.5 X |

Primary Examiner—Morris O. Wolk
Assistant Examiner—Joseph T. Zatarga
Attorneys—Joseph C. Kotarski, Henry H. Huth, Jerry B. Peterson, Jack N. Shears and Carroll Palmer ABSTRACT: A mixture of water and oxygen as an inhibitor for preventing hydrogen permeation of steel in ammonia service.

PROCESS FOR INHIBITING HYDROGEN PERMEATION OF STEEL IN AMMONIA SERVICE

BACKGROUND OF INVENTION

1. Field of Invention

This invention relates to the inhibition of hydrogen permeation into steel in contact with ammonia.

2. Description of Prior Art

In recent years there have been problems with failure of steels used in ammonia service due to cracking. Most of these failures have involved high-strength steels of the quenched-and-tempered variety. It is generally thought in the industry that these steels fail from stress-corrosion cracking. (See Loginow, A. W., and E. H. Phelps, "Stress-Corrosion Cracking of Steels in Agricultural Ammonia," Corrosion, Vol. 18, No. 8, pp. 299$t$–309$t$, Aug. 1962.) It is also generally accepted in industrial practice that the addition of 0.2 percent (wt.) or more of water added to the liquid ammonia with the absence of air will prevent the cracking.

SUMMARY OF INVENTION

According to this invention a mixture of water and oxygen is added to steel vessels containing ammonia to prevent cracking due to hydrogen permeation of said steel.

DETAILED DESCRIPTION

We now believe that such ammonia-service steels fail due to hydrogen embrittlement, and we have much new, original data to support the fact that considerable hydrogen does diffuse into steel when exposed to ammonia in the absence of oxygen. In fact, we have considerable experimental data to show that molecular hydrogen, when added to ammonia in the liquid or gas phase, can cause rather large inputs of hydrogen into the steel, these inputs being comparable to those caused by small amounts of $H_2S$ in brine, which readily cracks high-strength steels. We are concerned that the modern methods of production and handling of ammonia may leave considerable amounts of molecular hydrogen in the product.

Our data give evidence, contrary to present practice, that this high-hydrogen diffusion into steel is not effectively cut off nor controlled by the addition of water in the absence of oxygen. It has now been unexpectedly discovered that where we have small amounts of water and oxygen present, the hydrogen input into the steel has been cut off. We have found that the water present need not be as high as 0.2 percent (wt.) claimed by the industry. In fact, laboratory air containing less moisture than its dew point has been found to be extremely effective. Also, when water is present in concentrations as high as 0.2 percent (wt.) the oxygen is somehow depleted, and it is necessary to add additional oxygen to maintain protection. When the water content is very low, protection is maintained for a much longer time.

Our view is that it is chemically necessary or imperative to have this inhibitive system of oxygen and water, if hydrogen permeation is to be stopped (hence ammonia-caused cracking of these high-strength steels). We believe that what probably happens is that a ferric hydroxy oxide forms when an oxygen source (oxygen, air or other oxygen containing gas) is present and that this ferric hydroxy oxide is protective. Without this oxygen present, the ferrous hydroxide is nonprotective. Accordingly, we believe that oxygen is necessary to produce this protective film and that its continued presence is required to repair film damage at impurities and similar imperfections. Clearly, it is our discovery that hydrogen can be kept from permeating into iron or steel in ammonia by this means. We wish to stress that this inhibition system discovery is contrary to present ammonia industry practice and beliefs and comes only through our development of a new improved method of study and measurement of hydrogen permeation into metals.

Our research into the hydrogen permeation of carbon and low-alloy steels and the effects of contaminants to accelerate or inhibit it were made with a device consisting of a hollow carbon steel tube closed at one end and connected to a magnetic ion vacuum pump at the other end. This hollow carbon steel tube forming a probe was exposed to various ammonia environments while the ion pump current was being recorded. The pump current is a linear function of the amount of hydrogen permeation of the carbon steel probe.

The ion pump is rated as 1 l./sec. of air. With hydrogen, the pumping rate is about twice that of air. This in effect gives us a 2 l./sec. hydrogen pump. Using the calibration curve of current versus pressure, $10^{-6}$ amp of current indicates a pressure close to $10^{-7}$ torr. At this pressure and ambient temperature, 2 l./sec. is equal to $2.63 \times 10^{-7}$ cc./sec. at standard conditions. Following through with these calculations, it can be seen that the pressure in torr multiplied by 2.63 will convert the 2 l./sec. at ambient temperatures to standard cc./sec. of hydrogen. The pressure has a linear relationship with the current requirements of the ion pump. This will allow the amperes of current as recorded to be converted into standard cc./sec. of hydrogen by multiplying by 0.263.

Our probes used in our ammonia research were of low-carbon steel with a surface area of close to 48 cm.$^2$ exposed to the conditions inside the reactor. With conditions such that $10^{-6}$ amp of current was required by the ion pump, there would be a hydrogen permeation rate of $5.5 \times 10^{-9}$ standard cc./sec./cm.$^2$. Using these figures, the amps recorded can be converted into permeation rates of standard cc./sec./cm.$^2$ by multiplying the number of amps by $5.5 \times 10^{-3}$.

The following examples show the varying permeation rates of hydrogen through the steel probe for different conditions of ammonia with and without contaminants.

EXAMPLE 1

With 7½ inches of the probe in pure liquid $NH_3$ and 2 inches in the vapor phase at ambient temperature, the permeation rate of the probe surface at the highest input interval was $(0.22 \times 10^{-6}$ amp $\times 5.5 \times 10^{-3})$ or $1.21 \times 10^{-9}$ standard cc./sec./cm.$^2$.

EXAMPLE 2

With the probe completely in pure vapor phase $NH_3$ at atmospheric pressure and ambient temperature, the permeation rate was $(0.52 \times 10^{-6}$ amps $\times 5.5 \times 10^{-3})$ or $2.86 \times 10^{-9}$ cc./sec./cm.$^{2c.}$ With the probe completely in the vapor phase of a reactor containing 0.25 percent by volume of water and $NH_3$ vapor at atmospheric pressure and ambient temperature, the permeation rate was $(0.53 \times 10^{-6}$ amps $\times 5.5 \times 10^{-3})$ or $2.92 \times 10^{-9}$ cc./sec./cm.$^{2c.}$

EXAMPLE 4

With the probe completely in pure liquid $NH_3$ at ambient temperature without contamination, there was very little if any hydrogen permeation.

EXAMPLE 5

With the probe in liquid $NH_3$ at ambient temperature and with a cathodically generated hydrogen partial pressure of 4 p.s.i. above the $NH_3$ vapor pressure, the permeation rate was $(0.25 \times 10^{-6}$ amps $\times 5.5 \times 10^{-3})$ or $1.37 \times 10^{-9}$ cc./sec./cm.$^2$.

EXAMPLE 6

With the probe in the vapor phase of a reactor containing 25 p.s.i. partial pressure $H_2$, 125 p.s.i. partial pressure $NH_3$, 15 p.s.i. partial pressure $CO_2$, and more than 0.25 percent by volume $H_2O$, the permeation rate was $(16.0 \times 10^{-6}$ amp $\times 5.5 \times 10^3)$ or $8.8 \times 10^{-8}$ cc./sec./cm.$^2$.

EXAMPLE 7

With the probe and stressed carbon steel clips in liquid $NH_3$ contaminated with $H_2$ and $CO_2$, the permeation rate was $(32 \times 10^{b\mu 6}$ amp $\times 5.5 \times 10^{-3})$ or $1.76 \times 10^7$ cc./sec./cm.$^2$. This permeation level caused cracking of the steel clips overnight.

EXAMPLE 8

With the probe in pure $NH_3$ vapor at ambient temperature and atmospheric pressure, and with the permeation rate still increasing above $1.65 \times 10^{-9}$ cc./sec./cm.$^2$, a small amount of moist air was added which shut off the $H_2$ permeation. This probe remained inhibited even after the reactor was filled with liquid $NH_3$ and then vented to atmospheric pressure again. This indicates that a protective film must have been formed that remained stable on the probe surface after the air had been purged from the reactor by the vented $NH_3$.

EXAMPLE 9

With the probe in $NH_3$ vapor at ambient temperature in a reactor contaminated with $CO_2$ and with the $H_2$ permeation rate increasing rapidly above $6.6 \times 10^{-9}$ cc./sec./cm.$^2$, the $H_2$ permeation was stopped by the addition of moist air. This inhibited condition remained until the experiment was terminated 5 days later.

EXAMPLE 10

With the probe in $NH_3$ vapor at ambient temperature and atmospheric pressure in a reactor containing 0.25 percent by volume of $H_2O$, $CO_2$ was added as a contaminant and the permeation resulting was $1.39 \times 10^{-8}$ cc./sec./cm.$^2$ and still increasing when a small amount of dry $O_2$ was added to the reactor. This served to shut off the $H_2$ permeation, but only for one-half day. Thereafter, it was necessary to add $O_2$ at intervals to maintain protection.

EXAMPLE 11

With the probe in pure $NH_3$ (partially in liquid) at ambient temperature, a permeation rate of ($0.07 \times 10^{-6}$ amps $\times 5.5 \times 10^{-3}$) or $3.85 \times 10^{-10}$ cc./sec./cm.$^2$ was established. Dry air was added and established inhibition of $H_2$ permeation. When the liquid $NH_3$ was vented and the probe was left in the vapor phase, there was a resumption of the hydrogen permeation.

EXAMPLE 12

With the probe in pure $NH_3$ vapor at ambient temperature and atmospheric pressure, 0.25 percent of reactor volume was filled with water and its dissolved air which established $H_2$ permeation protection. The $H_2$ permeation rate was ($0.42 \times 10^{-6}$ amps $\times 5.5 \times 10^{-3}$) or $2.3 \times 10^{-9}$ cc./sec./cm.$^2$ and still increasing when the water was added. This reactor was then filled with pure liquid $NH_3$ and vented to atmospheric pressure. Again, permeation was evident and reached the normal level for pure $NH_3$ at atmospheric pressure and ambient temperature, even though the reactor still contained the 0.25 percent by volume water. The air would have been purged from the system by the escaping $NH_3$.

The previous examples established the fact that there is $H_2$ permeation of steel in $NH_3$ environments. This is increased considerably by $H_2$ and/or $CO_2$ contaminants. It was also established that water without air or $O_2$ (examples 3, 6, 10, and 12) would not prevent or reduce $H_2$ permeation. Water and air or $O_2$, or water containing air, would establish protection from $H_2$ permeation in all conditions presented in the examples. In the examples 10 and 12, where 0.25 percent of the reactor volume contained water, protection was not maintained if air or $O_2$ was purged from the system or without additions of $O_2$ or air at intervals to maintain protection. Air containing less moisture than its dew point at ambient temperature would establish protection which remained after the air was purged from the system or with extended periods of time.

Water without air or $O_2$ is unable to prevent or reduce $H_2$ permeation. While $O_2$ without added water will give some limited amount of protection due to the in situ formation of water from the reaction of $O_2$ and $H_2$ from the ammonia, this formation in sufficient quantities to establish and maintain protection is very slow.

The water levels present in the ammonia determine what minimum oxygen levels are required. However, we hold that a minimum mole ratio of oxygen to water must be at least 1 mole oxygen to 2 moles water present, this to obtain hydrogen inhibition. From this it will be noted that more water requires more oxygen to give effective hydrogen cutoff, and that this requires that a critical minimum be present at all times else the inhibitory action be curtailed. Even higher mole ratios of oxygen to water are, of course, desirable and offer insurance against time depletion of oxygen.

This new process requires oxygen as an effective inhibitor against the cracking of high-strength steels caused by hydrogen permeation. However, in order to simultaneously minimize corrosion and pitting via ammonia and oxygen, the water content of the ammonia should be held to the lowest practical p.p.m. levels.

Having thus described the invention by providing specific examples thereof, it is to be understood that no undue limitations or restrictions are to be drawn by reason thereof and that many variations and modifications are within the scope of the invention.

What is claimed is:

1. A process for inhibiting the hydrogen permeation of carbon and low-alloy steel vessels containing ammonia contaminated with hydrogen, which process consists essentially of adding from about 1 p.p.m. to about 2,500 p.p.m. water and a ratio of at least 1 mole of oxygen to 2 moles of water to said ammonia.

2. The process of claim 1 wherein said oxygen is present in the form of an oxygen-containing gas.

* * * * *